United States Patent
Fisher et al.

(10) Patent No.: US 6,314,608 B1
(45) Date of Patent: *Nov. 13, 2001

(54) WEDGE SHAPED NECK WINDSHIELD WIPER BLADE RUBBER WIPING ELEMENT

(75) Inventors: Brian A. Fisher, LaPorte, IN (US); Donald W. Stratton, Hot Springs Village, AR (US)

(73) Assignee: Cooper Automotive Products, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/634,070

(22) Filed: Aug. 8, 2000

Related U.S. Application Data

(63) Continuation of application No. 08/926,427, filed on Sep. 10, 1997, now Pat. No. 6,163,922.

(51) Int. Cl.⁷ .................................................. B60S 1/38
(52) U.S. Cl. ............................. 15/250.451; 15/250.48; D12/219
(58) Field of Search ..................... 15/250.48, 250.451, 15/250.452, 250.453, 245, 250.41, 250.4, 250.454, 250.361, 250.44, 250.43, 250.201; D12/219, 220

(56) References Cited

U.S. PATENT DOCUMENTS

| 1,853,715 | | 4/1932 | Anderson . | |
|---|---|---|---|---|
| 3,820,188 | | 6/1974 | Moorhead et al. . | |
| 4,649,592 | | 3/1987 | Beneteau . | |
| 4,722,112 | | 2/1988 | Schaub et al. . | |
| 5,423,105 | * | 6/1995 | Scott | 15/250.36 |
| 6,163,922 | * | 12/2000 | Fisher et al. | 15/250.48 |

FOREIGN PATENT DOCUMENTS

| 2101271 | 6/1973 | (DE) . |
|---|---|---|
| 4035336 | 5/1992 | (DE) . |
| 1319976 | 6/1973 | (GB) . |
| 226459 | 9/1989 | (JP) . |

\* cited by examiner

*Primary Examiner*—Gary K. Graham
(74) *Attorney, Agent, or Firm*—Reising, Ethington, Barnes, Kisselle, Learman & McCulloch, P.C.

(57) ABSTRACT

A wiper blade for a windshield wiper blade refill includes a crown located at the top of the wiper blade. The bottom of the wiper blade has a windshield-engaging lip. A neck extends from the crown toward the lip, and the neck increases in width in a direction away from the crown.

9 Claims, 6 Drawing Sheets of the flexor 120. The flexor 120 is generally trapezoidal in shape. A thick, tapered crown 130 defines the top of the wipe blade 110. Below the crown is a wedge-shaped neck 140 that is narrow at the top and wide at the bottom. The crown 130 and neck 140 fit within the trapezoidally shaped flexor 120, while the rest of the wiper blade 110 extends from the bottom of the flexor 120. A wide, rectangular bumper 150 at the base of the neck 140 cooperates with the crown 130 and the neck 140 to hold the wiper blade 110 in position within the flexor 120.

WEDGE SHAPED NECK WINDSHIELD WIPER BLADE RUBBER WIPING ELEMENT

This application is a continuation of application Ser. No. 08/926,427, filed Sep. 10, 1997, now U.S. Pat. No. 6,163,922.

BACKGROUND

The invention relates to a wiper blade for a windshield wiper blade refill.

In general, as shown in FIGS. 5 and 6, a windshield wiper blade carrier may have a wrap-around metal claw 20 that holds a wiper blade refill 900. The refill 900 has a wiper blade 910, which typically is made of rubber, mounted within a plastic flexor 920. The flexor 920 mates with the claw 20 to attach the refill 900 to the carrier 10. The wiper blade 910 includes a crown 930, a neck 940 and a bumper 950 that secure the blade 910 in the flexor 920. The wiper blade 910 also has a hinge 960 that bends to allow a body portion 970 to move relative to the rest of the blade 910 as the wiper moves back and forth across the windshield. A lip 980 makes contact with the surface of the windshield to remove water from the windshield.

SUMMARY

In one aspect, generally, the invention features a wiper blade that has a crown at the top. A windshield-engaging lip is located at the bottom of the wiper blade. A neck extends from the crown toward the lip, and the neck increases in width in the direction away from the crown.

Embodiments may include one or more of the following features. The crown may be trapezoidal in shape. The neck may include sides that form an angle of greater than six degrees. The wiper blade may include a bumper that extends from the neck and that has an underside surface. A hinge may extend from the underside surface of the bumper. A body may extend from the hinge and may be configured to pivot about the hinge. The windshield-engaging lip may be formed at the bottom end of the body.

A wiper blade refill may include the wiper blade described above and a flexor. The flexor may have a top portion that conforms in shape to the crown of the wiper blade. The flexor also may have a neck portion that conforms in shape to the neck of the wiper blade. The flexor may include a bottom edge strip that may extend from the bottom end of the flexor. The portion of the flexor that corresponds to the underside surface of the top portion of the wiper blade may be a flat surface that is parallel to the bottom edge strip.

In another aspect, a wiper blade refill is configured to be installed in the wrap-around claw of a wiper blade carrier. The wiper blade refill includes a wiper blade that has a top portion and a neck portion. The wiper blade refill also includes a flexor that conforms in shape to the top and neck portions of the wiper blade. The neck portion of the wiper blade increases in width in the direction away from the top portion of the wiper blade.

Embodiments may include one or more of the following features. The top portion of the wiper blade may be trapezoidal in shape. The neck portion may include sides that form an angle of greater than six degrees. The top portion of the wiper blade may be configured to be positioned within the wrap-around claw.

In another aspect, a flexor is configured to mate with a wiper blade that has a crown at the top, a windshield-engaging lip at the bottom, and a neck that extends from the crown toward the lip. The neck increases in width in the direction away from the crown. The flexor includes a top portion that conforms in shape to the crown of the wiper blade, a neck portion that conforms in shape to the neck of the wiper blade, and a bottom edge strip.

Embodiments may include one or more of the following features. The portion of the flexor that corresponds to the underside surface of the crown of the wiper blade may be a flat surface that is parallel to the bottom edge strip. The flexor may be trapezoidal in shape.

Other features and advantages will be apparent from the following detailed description, including the drawings, and from the claims.

DESCRIPTION

Figure 1:
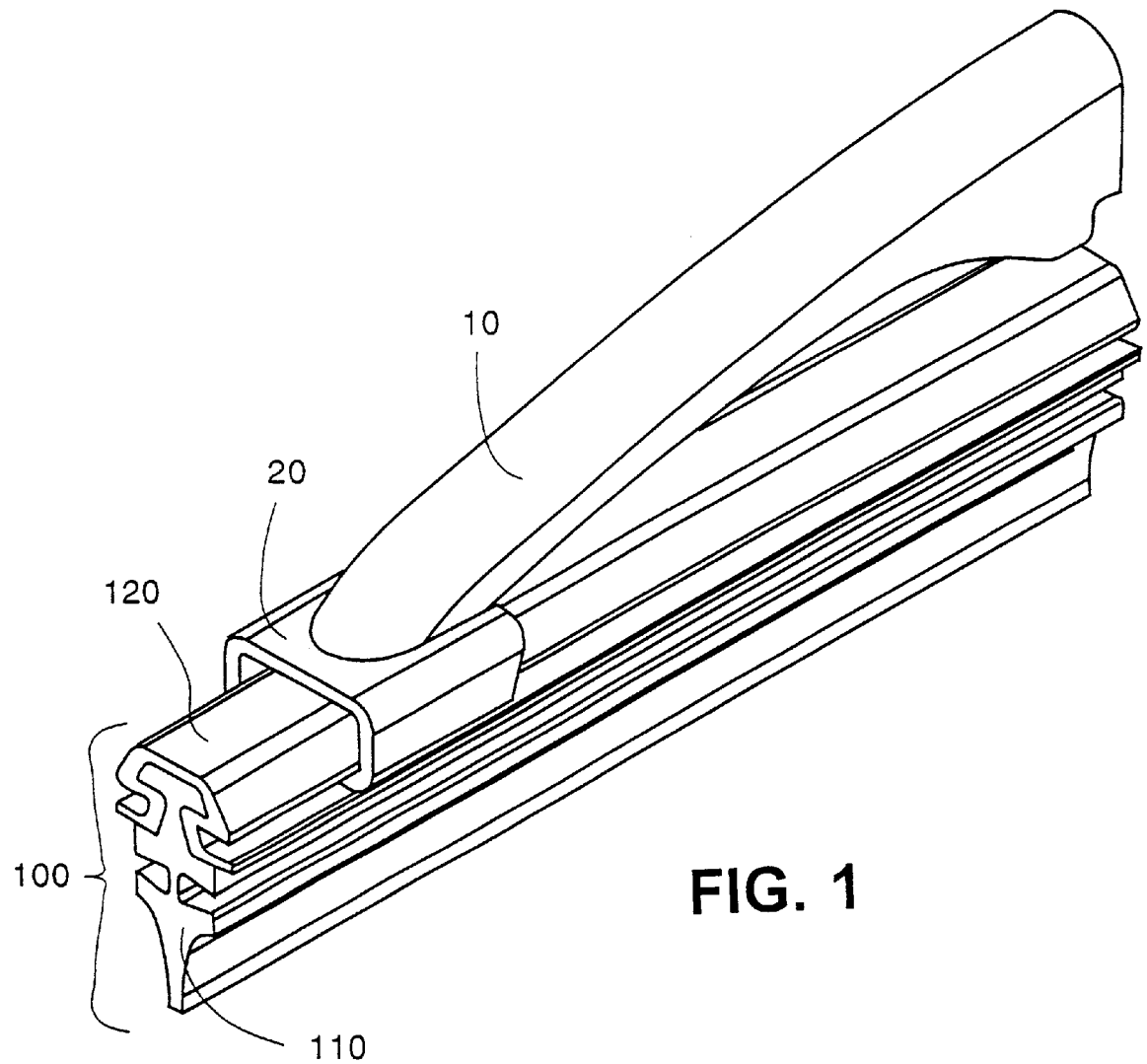
FIG. 1 is a perspective view of a wiper blade installed in a wiper blade carrier.
Figure 2:
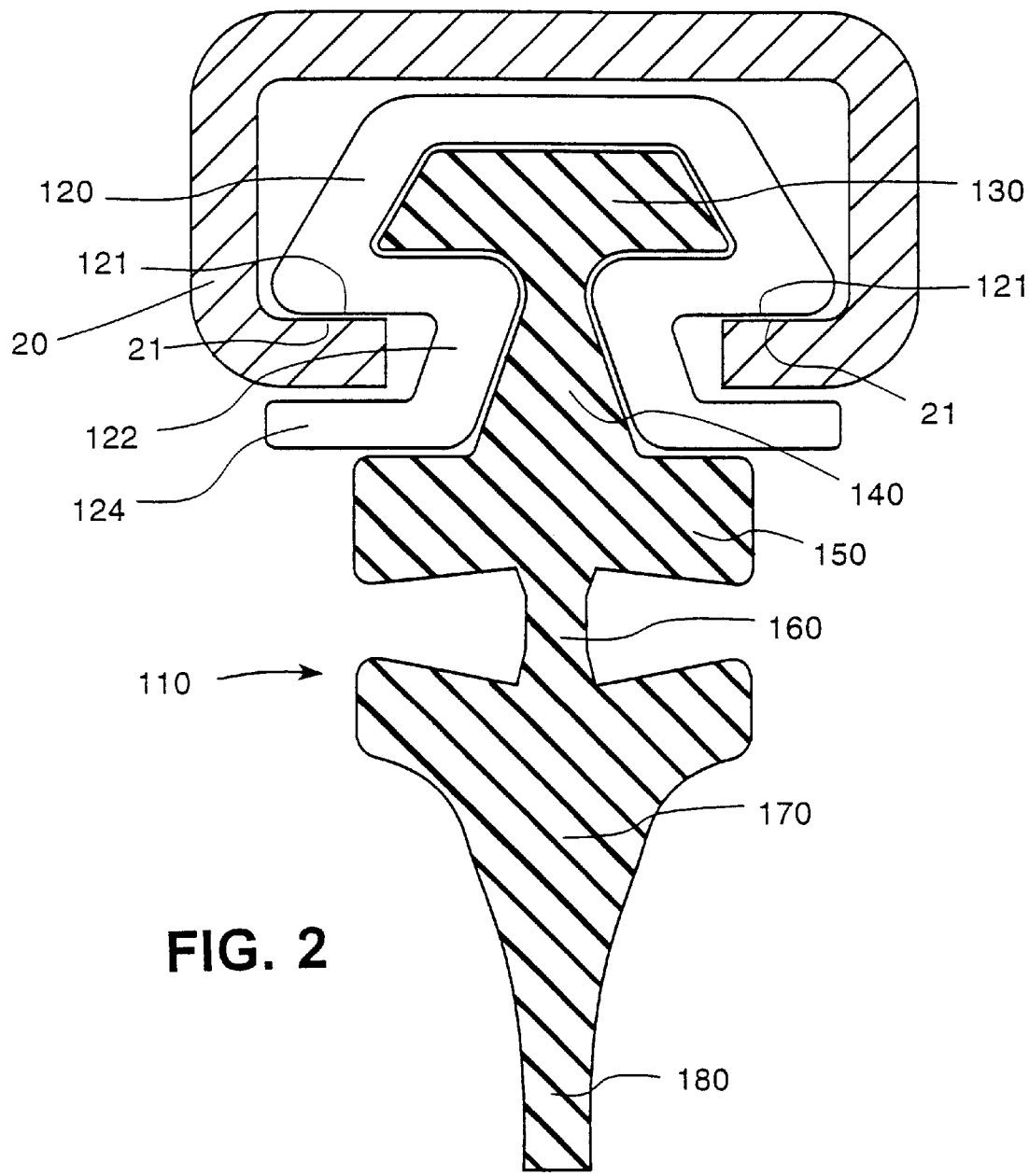
FIG. 2 is a sectional view of the wiper blade and carrier of FIG. 1.

Referring to FIGS. 1 and 2, a wiper blade refill 100 is mounted in a wiper blade carrier 10 having a wrap-around metal claw 20. The refill 100 includes a wiper blade 110, made of a solid, flexible material such as rubber. The wiper blade 110 is mounted within a flexor 120, typically made of plastic, which attaches the wiper blade 110 securely to the claw 20. The flexor 120 is generally trapezoidal in shape.

A narrow hinge 160 and a triangular body 170 are formed below the bumper 150. The body 170 pivots about the hinge 160 as the wiper blade 110 is moved back and forth across the windshield. The body 170 narrows at the bottom to a lip 180 that contacts the surface of the windshield and removes water from the windshield.

Figure 5:
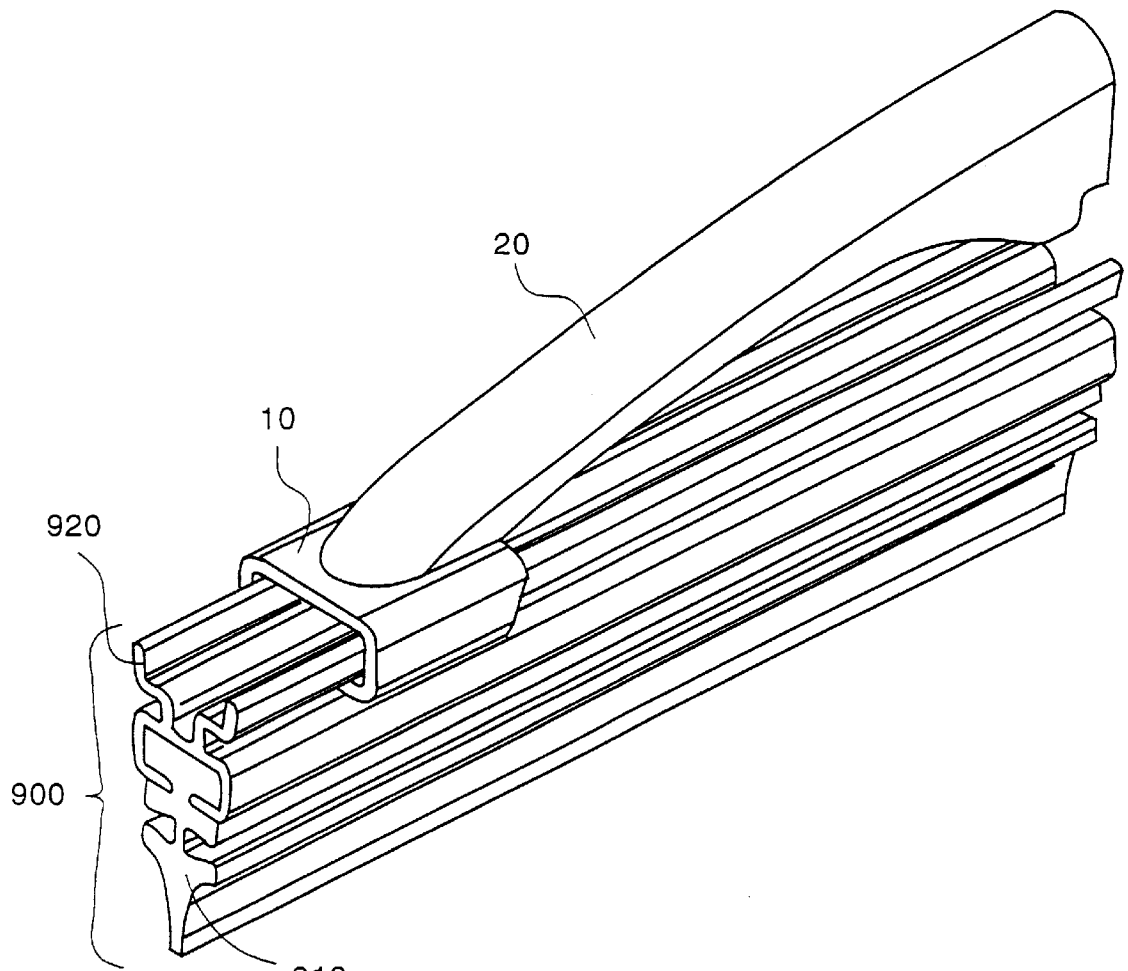
FIG. 5 is a perspective view of a wiper blade and wiper blade carrier.
Figure 6:
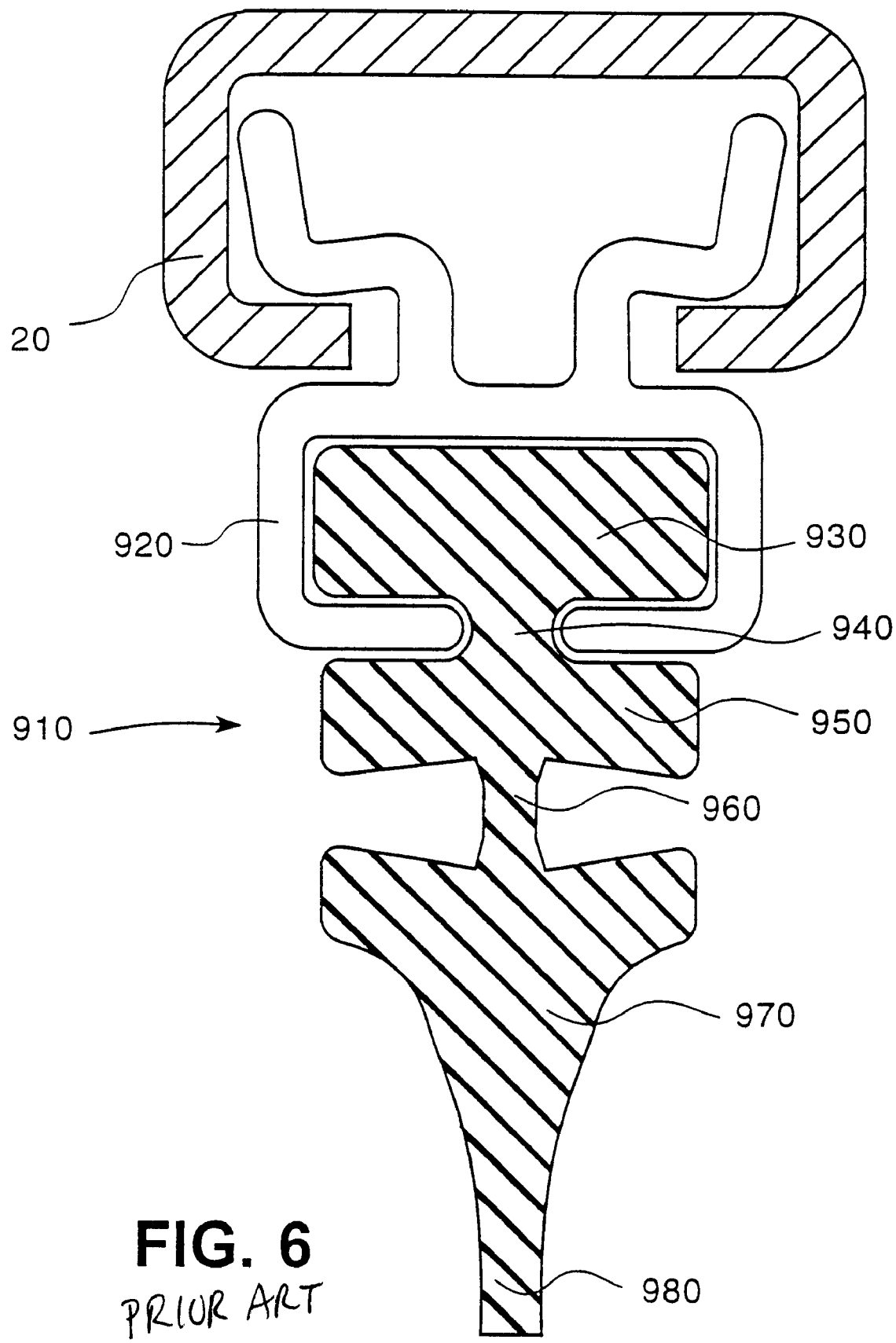
FIG. 6 is a sectional view of the wiper blade and carrier of FIG. 5.

Placement of the crown 130 and part of the neck 140 within the claw 20 reduces the overall height of the wiper blade assembly above the windshield compared to wiper assemblies that suspend the wiper blade below the claw, such as the one shown in FIGS. 5 and 6. The reduced height reduces wind lift forces, which otherwise are caused by high velocity wind and which would tend to lift the wiper blade from the surface of the windshield. The reduced height also results in a smaller moment arm which reduces bending forces on the upper portion of the wiper blade.

The trapezoidal shape of the crown 130 and the flexor 120 provide improved mating between the wrap-around claw 20 and the refill 100. The portions of the flexor 120 corresponding to the bottom of the crown 130 provide flat surfaces 121 that are parallel to upper surfaces 21 at the ends of the claw 20. The surfaces 121 cooperate with the bottom edge strip 124 of the flexor to prevent movement of the crown 130 and neck 140 portions of the wiper blade 110.

The bumper 150 mates closely with the bottom edge strip 124 to prevent excessive bending of the neck 140.

Figure 3:
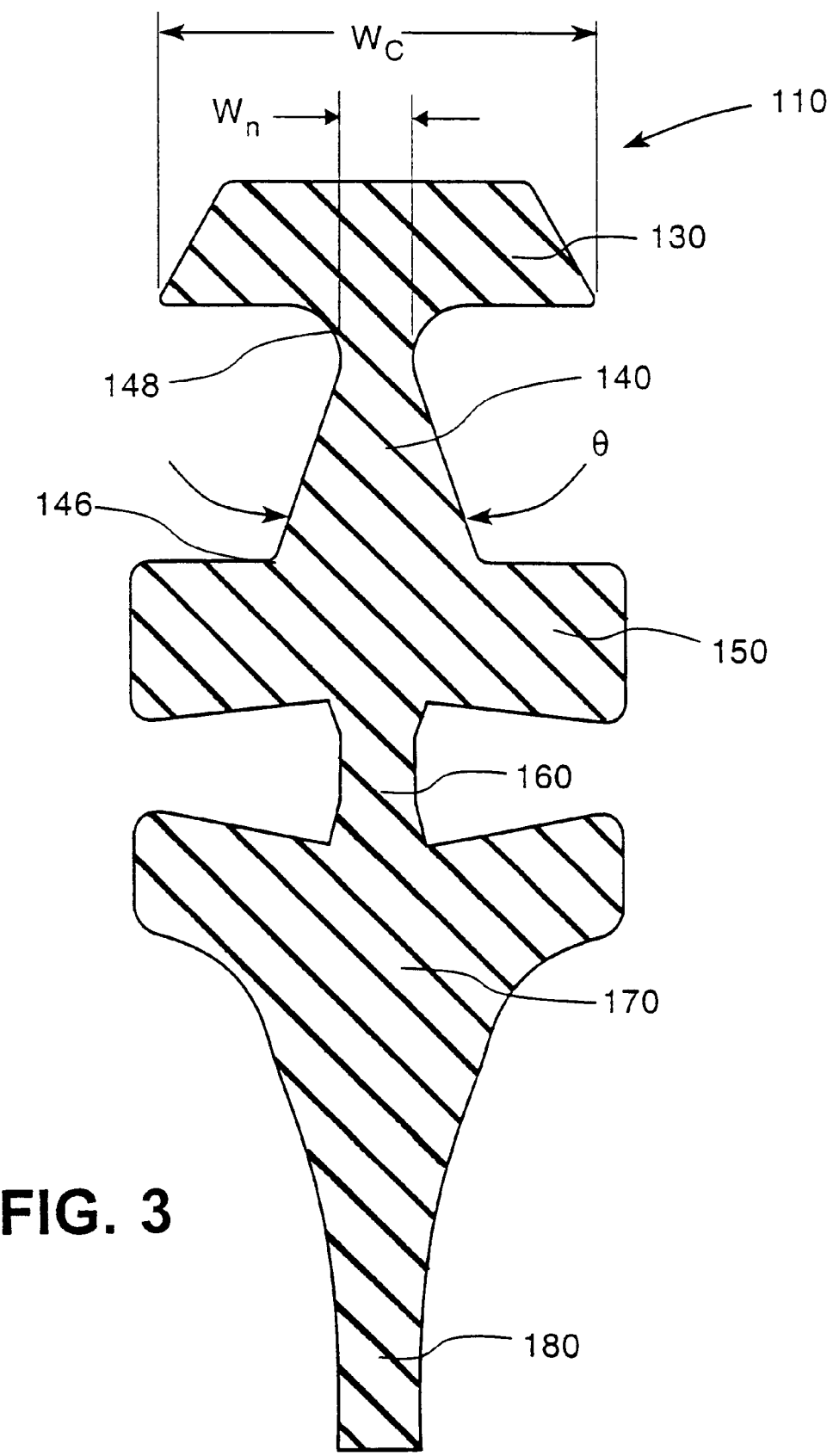
FIG. 3 is a sectional view of the wiper blade of FIG. 1.

Computer modeling has shown that significant tensile and compressive forces occur in the neck 140 during operation of the wiper blade. Ideally, the hinge-like bending of the wiper blade 110 should occur in the hinge 160 rather than in the neck 140 or other portions of the blade. Therefore, as shown in FIG. 3, the neck 140 is wedge-shaped, i.e. narrower at the top portion 148 and wider at the bottom portion 146, where tensile and compressive forces are greatest. This configuration reduces the likelihood of failure of the wiper blade 110 during operation.

The wedge-shaped neck also reduces the likelihood of permanent deformation of the neck 140, which may occur while the wiper blade assembly is "parked" in its resting position at the bottom of the windshield. This deformation, caused by the blade resting for long periods in a bent position, may cause chattering noise or non-uniform wiping during operation. In addition, the wedge-shaped neck 140 seats into a mating wedge-shaped portion of the flexor 122, as shown in FIG. 2. This configuration provides additional stability to the wiper blade 110 and further reduces the possibility of deformation of the neck 140.

Another advantage of the wedge-shaped neck 140 is that it provides a greater ratio between the width of the crown, $W_c$, and the width of the neck, $W_n$, resulting in a greater retention force between the wiper blade 110 and the flexor 120. The increased retention force prevents the wiper blade 110 from being pulled out of the flexor 120 during operation, which could lead to loss of the blade and scratching of the windshield surface.

The angle of the wedge, $\theta$, may be selected to optimize the characteristics discussed above. For example, FIG. 3 shows a wedge angle of approximately 30°, however other wedge angles may be used. As a further example, testing has been performed on wiper blades having a wedge angle of 6°.

Figure 4:
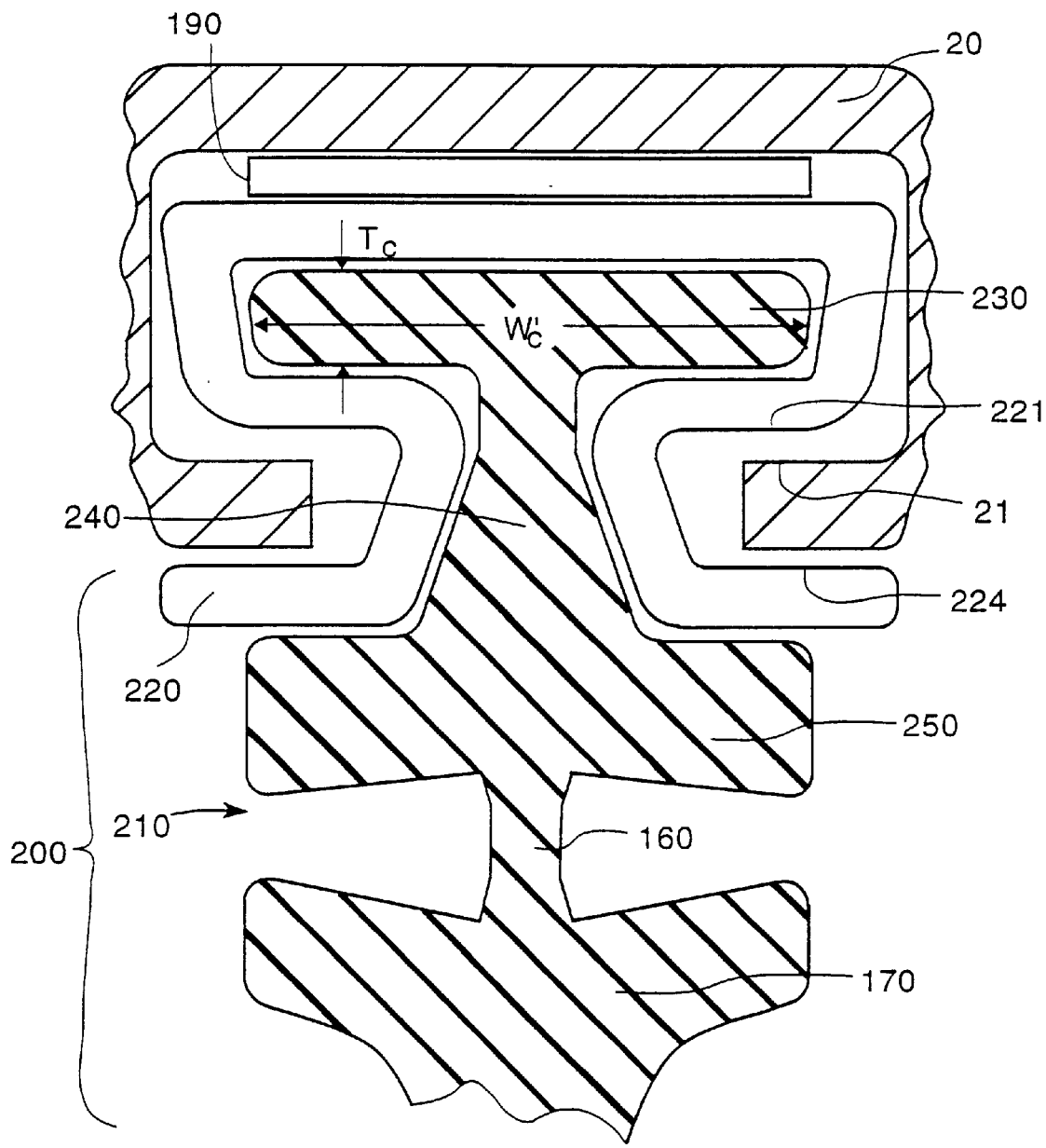
FIG. 4 is a sectional view of a wiper blade installed in a wiper blade carrier.

Referring to FIG. 4, in an alternative embodiment, a metal clip 190 provides support to a refill 200. To provide space for the metal clip 190, the wiper blade 210 includes a wide, thin crown 230. The increased width, $W_c'$, of the crown 230 compensates for the reduced thickness, $T_c$, of the crown 230 to ensure that sufficient retention forces are provided to retain the wiper blade 210 in the flexor 220. The top portion of the flexor 220 is wider and shorter than in the first embodiment to accommodate the wide, thin crown 230. As in the first embodiment, the neck 240 is narrow at the top near the crown 230 and wide at the bottom near the bumper 250. Also, portions of the flexor 220 corresponding to the bottom of the crown provide flat surfaces 221 that are parallel to upper surfaces 21 at the ends of the claw 20. The surfaces 221 cooperate with the bottom edge strip 224 of the flexor to prevent movement of the crown 230 and neck 240 portions of the wiper blade 210. The bumper 250 mates closely with the bottom edge strip 224 to prevent excessive bending of the neck 240.

Other embodiments are within the scope of the following claims.

What is claimed is:

1. A wiper blade refill configured to be installed in a wrap-around claw of a wiper blade carrier, the wiper blade refill comprising:

a wiper blade having a top portion having a flat underside surface and a neck portion extending downwardly from said underside surface; said neck portion having a wedge-shaped configuration having a width that increases in a direction away from the top portion; and a flexor having top and neck portions that conform substantially in shape to the top and neck portions of the wiper blade respectively, the neck portion of the flexor increasing in width in a direction away from the top portion of the flexor and being substantially adjacent to and coextensive with the neck portion of the wiper blade; and a bumper extending from the neck portion of the wiper blade in underlying relation to the flexor and having an upper surface positioned to confront the flexor during operation of the wiper blade, said upper surface defined by two planar surfaces lying in a common plane.

2. The wiper blade refill of claim 1, wherein the top portion of the wiper blade is trapezoidal in shape.

3. The wiper blade refill of claim 1, wherein the neck portion of the wiper blade includes sides that form an angle with respect to one another that is greater than six degrees.

4. The wiper blade refill of claim 1, wherein the top portion of the wiper blade is configured to be positioned within the wrap-around claw.

5. The wiper blade refill of claim 1, wherein the flexor further comprises a bottom edge strip extending from a bottom end of the flexor.

6. The wiper blade refill of claim 5, wherein a portion of the flexor that corresponds to an underside surface of the top portion of the wiper blade is a substantially flat surface that is parallel to the bottom edge strip.

7. The wiper blade refill of claim 1, wherein said neck portion of said wiper blade is supported immediately adjacent said neck portion of said flexor so that said neck portion of said wiper blade is substantially supported against lateral movement relative to said flexor during operation of said wiper blade.

8. The wiper blade refill of claim 1, wherein said wedge shaped configuration of said neck portion of said wiper blade increases in cross sectional area in a direction away from the top portion of the wiper blade.

9. The wiper blade refill of claim 1, wherein said wedge shaped configuration of said neck portion of said wiper blade commences immediately adjacent said flat underside surface of said top portion.

* * * * *